United States Patent Office 3,113,865

Patented Dec. 10, 1963

3,113,865

HEAT DEVELOPABLE DIAZO SULFONES

John J. Sagura and James A. Van Allan, Rochester, N.Y., assignors to Eastman Kodak Company, Rochester, N.Y., a corporation of New Jersey No Drawing. Filed May 5, 1960, Ser. No. 26,980
8 Claims. (Cl. 96—49)

This invention relates to improved methods of graphic reproduction and in particular to methods of this type which employ light-sensitive copying sheets sensitized with aromatic diazo compounds.

Aromatic diazo compounds are known to be light sensitive and have previously been employed in two types of photoprinting processes. These are commonly classified as one-component or wet development processes and two-component or dry development processes. In a one-component process the aromatic diazo compound is incorporated in a light-sensitive layer composed, for example, of a natural or synthetic high polymer coated on a photographic support. When an element of this type is given an image-wise exposure to light, for example, under a pattern such as a graphic original, the aromatic diazo compound is decomposed in the exposed areas. The undecomposed aromatic diazo compound in the unexposed areas is then developed by contacting the element with a solution of an azo coupling component in order to form an azo dye image. Development of one-component diazo materials is usually carried out in alkaline solution although there are some diazo compounds which are developable in acid solution. In the two-component or dry process the aromatic diazo compound and the azo coupling component are both incorporated in the light-sensitive layer. After exposure, development in the dry process is carried out by contacting the light-sensitive layer with ammonia fumes. In the two-component process it is necessary for best results to select diazo compounds which are sufficiently inert that they will not react with the azo coupling component in the light-sensitive layer prior to development. Compounds meeting this requirement which have been suggested previously include the aromatic p-diamines and o-aminonaphthols. The diazo sulfones disclosed in Sprung and Schmidt, U.S. Patent No. 2,465,760, issued March 29, 1949, are also capable of forming dye images on development with azo dye coupling components in alkaline medium. Sprung et al. also found that the diazo sulfones when incorporated in a two-component light-sensitive layer together with an azo coupling component were stable on storage under ordinary conditions for indefinite periods of time without danger of pre-coupling of the dye components. In other respects the Sprung et al. process was the same as those of the prior art in that development of the two-component light-sensitive layers was accomplished by the use of ammonia fumes.

The art has constantly sought to develop methods of reproducing graphic materials which require less complex equipment, less handling and fewer reagents than systems previously available. It is, therefore, an object of the present invention to provide a simplified two-component dry process for the reproduction of graphic material. It is another object of the invention to eliminate the necessity for developing two-component diazo sensitized materials with ammonia fumes which requires the use of special equipment and precautions for the safety and comfort of the operator.

These and other objects of the invention which will become apparent from the following detailed description are attained by eliminating the previously required alkaline development step, e.g., with ammonia fumes, and substituting a development procedure employing heat. The present invention is based on the discovery that certain aryl diazo sulfones will couple with conventional azo coupling components to form azo dyes under the influence of heat alone. Contrary to the teachings of the prior art, alkaline solutions or fuming ammonia vapors are not required to bring about the desired azo dye-forming coupling reaction. This discovery makes possible a number of improved methods of graphic reproduction employing a two-component light-sensiitve layer. A fewer of these will be described below for purposes of illustrating the invention, others will be apparent to those skilled in the art.

A copying material useful in the process of the present invention may comprise a conventional photographic support carrying a light-sensitive layer containing a light-sensitive aryl diazo sulfone together with a conventional azo coupling compound. Such a copying material is first exposed to light under a pattern whereby the aryl diazo sulfone is differentially destroyed. A visible print is then developed by heat treatment of the light-sensitive layer at a temperature in the range from about 100 to about 130° C. for sufficient time to cause coupling of the reactive components in the unexposed areas to form an azo dye image. A development time of about thirty seconds is usually sufficient for this purpose although longer or shorter times may be employed as desired depending upon the reactivity of the particular diazo compound and azo coupling component employed. In another embodiment of the invention a light-sensitive layer such as that described above is first exposed to heat or infrared radiation in a pattern in order to cause coupling of the aryl diazo sulfones and azo coupling component in the radiated areas to form the desired dye image. The resulting print is then stabilized by a general exposure to light in order to destroy the residual light-sensitive aryl diazo sulfone.

The aryl diazo sulfones useful in the present invention have the general formula $$(\text{—Ar—N=N—SO}_2\text{—R})_n$$

in which Ar— represents an aryl group, for example, a radical derived from a compound of aromatic character such as benzene, naphthalene, pyridine, quinoline, carbazole and the like, R represents a radical derived from an aliphatic compound or an aryl radical as above, and $n$ is an integer from 1 to 2. When $n$ is 2 the formula represents aryl bis diazo sulfones. The radicals represented by Ar— and R may be substituted or unsubstituted. Particularly useful compounds result when these radicals contain substituents such as alkylamino, arylamino, aralkylamino, heterocyclic amino, and aliphatic and aromatic acylamino. Suitable substituents of this class include methylamino, diethylamino, β,β′-dihydroxyethylamino, N-methyl-N-β-hydroxyethylamino, phenylamino, benzylamnio, 2-benzothiazoylamino, 2-pyridylamino, methyl, ethyl, butyl, lauryl, octadecyl, methoxy, butoxy, phenoxy, acetamido, benzimido and the like, among others.

Although any of the azo coupling components known to the art may be employed in the invention it is preferred to use fast coupling components, i.e., compounds of high coupling energy. Such coupling components are capable of coupling in neutral or even slightly acidic media with the heat transformation products of the described aryl diazo sulfones. Specific coupling components useful in the invention include resorcinol, phloroglucinol, 2,3-dihydroxynaphthalene, 3-methyl-1-phenyl-5-pyrazolone, and acetoacetic acid anilides.

Light-sensitive layers for use according to the invention may contain additional substances commonly employed in diazotype materials. Polyhydric alcohols, fused ring hydrocarbons, thiourea, or thiosinamine, for example, may be added to the layers. The printing materials are, of course, somewhat modified thereby as regards their light sensitivity and velocity of development. It is also very advantageous to add a weak acid, for instance acetic acid, to the layers because the stability of the printing material is increased thereby.

In its preferred embodiment, the process of this invention is carried out by coating on a suitable support such as paper, cellulose derivatives, ceramic materials, textile materials, glass or a metallic surface, a coating preparation containing the aryl diazo sulfone, an azo dye coupling component, thiosinamine, a weak acid such as acetic acid, a natural or synthetic high polymer, and a solvent. The coated material is then dried and exposed under a positive or negative pattern and developed by heat treatment at 100–130° C. The exact mechanism of the development reaction is unknown but is believed, however, to involve as the primary process a thermal rearrangement of the aryl diazo sulfone to an aryl diazo sulfinate of greater coupling power than the parent sulfone.

The invention will now be described in greater detail in conjunction with the following specific examples which are illustrative only and are not to be construed as limiting the invention.

*Example 1*

A coating solution was prepared of equimolar amounts of 4-diethylamino-2-methylbenzenediazo phenyl sulfone and pholoroglucinol in 10 percent Vinylite VYLF-2-butanone dope. Vinylite VYLF is a copolymer of vinyl chloride and vinyl acetate, 85–88% vinyl chloride, molecular weight 6,000. A trace of thiosinamine was added, and the solution was coated on paper and allowed to dry. The dry plate was exposed through a positive pattern to a sun lamp at 10 inches for 30 seconds and then heat treated at 100–130° C. for 30 seconds. A brown-on-white positive print was obtained.

Substitution of 2,3-dihydroxynaphthalene for the phloroglucinol in the coating composition above affords a blue image and with 1,5-dihydroxynaphthalene as the coupling component a magenta image results. Omission of the thiosinamine from the composition has no effect on the speed of development, indicating that it does not function as a source of ammonia.

*Example 2*

A coating solution was prepared of equimolar amounts of 4-dimethylaminobenzenediazo phenyl sulfone and 2,3-dihydroxynaphthalene in Vinylite VYLF - 2 - butanone dope containing a small amount of thiosinamine and glacial acetic acid. The solution was coated on paper and allowed to dry. The dry plate was exposed through a positive pattern to a sun lamp at 10 inches for one minute and then heat treated at 100–130° C. for 30 seconds. A blue-on-white positive print of good quality was obtained.

In order to produce a colored image according to another embodiment of the invention a plate coated with an aryl diazo sulfone and an azo coupling component dissolved or dispersed in a colloidal vehicle is exposed to infrared radiation in contact with an original document to be copied containing an infrared absorbing pattern. In the infrared absorbing regions of the pattern sufficient heat is developed to cause coupling of the azo coupling component and the aryl diazo sulfone in the copy paper in contact with the infrared absorbing areas. The exposure can be made through the original or through the copy paper to give either conventional or reflex copies. The prints obtained in this way are stabilized by exposure to ultraviolet light or for longer periods of time to ordinary light in order to decompose the residual uncoupled aryl diazo sulfone. In still another embodiment of the invention simultaneous printing and stabilization is effected by exposing the copy paper through the original to both infrared and ultraviolet radiation. The several embodiments of the invention just described in which a colored image is produced by heat or infrared irradiation and stabilized by a general exposure to light of shorter wave length, produce prints which are permanently stable on storage and which are, therefore, superior in this respect to various types of thermographic copies produced by previously available methods.

Premature coupling of the aryl diazo sulfone and the azo coupling component may be prevented among other means by coating the two-components in discrete phases as, for example, in separate fusable layers or in encapsulated form.

*Example 3*

A coating on a paper plate was made of 4-diethylamino-2-methylbenzenediazophenylsulfone, 2,3-dihydroxynapththalene, and allythiourea in Vinylite VYLF. The coated side of the plate was then placed in contact with the back of a typewritten original, and the two sheets were run through a "Thermo-Fax Secretary" copying machine with the original facing the light source. A blue image was recorded. The print was then fixed by exposure to an RS sun lamp to destroy residual yellow aryldiazosulfone and to afford a more pleasing white background.

*Example 4*

Substitution of benzoylacetonitrile for the dihydroxynaphthalene in Example 3 afforded a magenta image.

The aryl diazo sulfones employed in the present invention may be prepared by the reaction of a diazo compound with a sulfinic acid, by oxidation of a $\beta$-aryl sulfonhydrazide, by condensation of diazonium with a sulfonamide or, by decomposition of a diazo thiosulfate, all according to known procedures. The most suitable method of preparation of these compounds has been found to be the reaction of a suitable diazo compound with a sulfinic acid.

It will be apparent to those skilled in the art from the foregoing description that the methods of the present invention provide highly useful means of obtaining copies of graphic originals with greater convenience than previous methods of this type which require the use of ammonia fumes or alkaline solutions for the development of the desired azo dye images.

We claim:

1. In a method of graphic reproduction employing a light-sensitive copy sheet having a light-sensitive layer containing a mixture of an azo coupling component selected from the class consisting of phenols, naphthols, 5-pyrazolones and acetoacetic acid anilides and a light-sensitive aryl diazo sulfone of the general formula:

$$(\text{—ArN}{=}\text{NSO}_2\text{R})_n$$

in which Ar— represents an aryl radical, R represents a radical selected from the group consisting of an aryl, alkylamino substituted aliphatic, arylamino substituted aliphatic, aralkylamino substituted aliphatic, heterocyclic amino substituted aliphatic, aliphatic acylamino substituted aliphatic and aromatic acylamino substituted aliphatic radicals and $n$ represents an integer of from 1 to 2, the improvement which consists of developing said light-sensitive layer by heating it to a temperature from about 100 to about 130° C. at which temperature the said azo coupling component is capable of coupling with said aryl diazo sulfone in the absence of further substances to form an azo dye.

2. In a method of graphic reproduction employing a light image exposed light-sensitive copy sheet having a light-sensitive layer containing a mixture of an azo coupling component selected from the class consisting of phenols, naphthols, 5-pyrazolones and acetoacetic acid anilides and a light-sensitive aryl diazo sulfone of the general formula:

$$(\text{—ArN}{=}\text{NSO}_2\text{R})_n$$

in which Ar— represents an aryl radical, R represents a radical selected from the group consisting of an aryl, alkylamino substituted aliphatic, arylamino substituted aliphatic, aralkylamino substituted aliphatic, heterocyclic amino substituted aliphatic, aliphatic acylamino substituted aliphatic and aromatic acylamino substituted aliphatic radicals and *n* represents an integer of from 1 to 2, the improvement which consists of developing said light-sensitive layer by heating it to a temperature from between about 100 to about 130° C. at which temperature the said azo coupling component is capable of coupling with said aryl diazo sulfone in the absence of further substances, to form an azo dye image in areas of said sheet which were not exposed to light.

3. The method of claim 2 in which the azo coupling component is phloroglucinol and the aryl diazo sulfone is 4-diethylamino-2-methylbenzenediazo phenyl sulfone.

4. The method of claim 2 in which the azo coupling component is 2,3-dihydroxynaphthalene and the aryl diazo sulfone is 4-diethylamino-2-methylbenzenediazo phenyl sulfone.

5. The method of claim 2 in which the azo coupling component is 2,3-dihydroxynaphthalene and the aryl diazo sulfone is 4-dimethylaminobenzenediazo phenyl sulfone.

6. In a method of graphic reproduction employing a light-sensitive copy sheet having a light-sensitive layer containing a mixture of an azo coupling component selected from the class consisting of phenols, naphthols, 5-pyrazolones and acetoacetic acid anilides and a light-sensitive aryl diazo sulfone of the general formula:

$$(\text{—ArN=NSO}_2\text{R})_n$$

in which Ar— represents an aryl radical, R represents a radical selected from the group consisting of an aryl, alkylamino substituted aliphatic, arylamino substituted aliphatic, aralkylamino substituted aliphatic, heterocyclic amino substituted aliphatic, aliphatic acylamino substituted aliphatic and aromatic acylamino substituted aliphatic radicals and *n* represents an integer of from 1 to 2, the improvement which consists of:

(1) exposing the said light-sensitive layer to an infrared image so that in the areas of said light-sensitive layer exposed to infrared radiation, the temperature of said layer is raised to the range of from about 100 to about 130° C. at which temperature the said azo coupling component is capable of coupling with said aryl diazo sulfone in the absence of further substances to form an azo dye image corresponding to said infrared image, and (2) exposing the said azo dye image bearing layer to light for a sufficient time to decompose substantially all residual unreacted light-sensitive aryl diazo sulfone in said layer.

7. The method of claim 6 in which the azo coupling component is 2,3-dihydroxynaphthalene and the aryl diazo sulfone is 4-diethylamino-2-methylbenzenediazo phenyl sulfone.

8. The method of claim 6 in which the azo coupling component is benzoylacetonitrile and the aryl diazo sulfone is 4-diethylamino-2-methylbenzenediazo phenyl sulfone.

References Cited in the file of this patent

UNITED STATES PATENTS

| | | |
|---|---|---|
| 2,429,249 | Von Glahn | Oct. 21, 1947 |
| 2,465,760 | Sprung et al. | Mar. 29, 1949 |
| 2,653,091 | Grieg | Sept. 22, 1953 |
| 2,699,392 | Herrick et al. | Jan. 11, 1955 |
| 2,727,820 | Botkin et al. | Dec. 20, 1955 |
| 2,789,904 | Benbrook et al. | Apr. 23, 1957 |
| 2,822,272 | Kosalek et al. | Feb. 4, 1958 |